(12) United States Patent
Qi et al.

(10) Patent No.: US 10,876,829 B2
(45) Date of Patent: Dec. 29, 2020

(54) COMPACT MEASUREMENT DEVICE CONFIGURATION FOR INTEGRATING COMPLEX CIRCUITS

(71) Applicant: Mitutoyo Corporation, Kanagawa-ken (JP)

(72) Inventors: Bernadette Baqui Qi, Redmond, WA (US); Richard Alan Wissner, Redmond, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 179 days.

(21) Appl. No.: 16/259,554

(22) Filed: Jan. 28, 2019

(65) Prior Publication Data

US 2019/0170503 A1 Jun. 6, 2019

Related U.S. Application Data

(63) Continuation of application No. PCT/US2018/053176, filed on Sep. 27, 2018.
(Continued)

(51) Int. Cl.
*G01B 5/008* (2006.01)
*G01B 11/00* (2006.01)
(Continued)

(52) U.S. Cl.
CPC ............ *G01B 11/007* (2013.01); *G01B 5/008* (2013.01); *G01B 5/012* (2013.01); *G01B 11/005* (2013.01);
(Continued)

(58) Field of Classification Search
CPC ..... G01B 11/0007; G01B 5/008; G01B 5/012
(Continued)

(56) References Cited

U.S. PATENT DOCUMENTS 5,509,211 A   4/1996   Ernst
5,552,883 A   9/1996   Busch-Vishniac et al.
(Continued)

FOREIGN PATENT DOCUMENTS

WO   2017/182875 A1   10/2017

OTHER PUBLICATIONS

International Search Report, dated Nov. 21, 2018, for International Application No. PCT/US2018/053176, 2 pages.
(Continued)

*Primary Examiner* — George B Bennett
(74) *Attorney, Agent, or Firm* — Seed IP Law Group LLP

(57) ABSTRACT

A compact coordinate measuring machine (CMM) probe configuration is provided for integrating complex circuits into a CMM probe. The CMM probe configuration includes a stylus position detection portion, a stylus suspension portion and a circuit board assembly. The stylus position detection portion includes an alignment frame and an optical sensing configuration. The circuit board assembly includes a rigid-flex circuit element and a three-dimensional carrier frame. The rigid-flex circuit element includes a set of board portions joined by a set of flexible bend portions. The rigid-flex circuit element is folded at the bend portions to locate some of the board portions to be proximate to and/or joined to corresponding support surfaces on the carrier frame. The circuit board assembly at least partially surrounds a majority of the stylus position detection portion and is joined thereto with the carrier frame fixed relative to the alignment frame.

27 Claims, 12 Drawing Sheets

Related U.S. Application Data

(60) Provisional application No. 62/565,961, filed on Sep. 29, 2017.

(51) Int. Cl.
*G01B 5/012* (2006.01)
*G01S 7/481* (2006.01)
*G01B 21/04* (2006.01)

(52) U.S. Cl.
CPC ........... *G01B 21/04* (2013.01); *G01B 21/047* (2013.01); *G01S 7/481* (2013.01)

(58) Field of Classification Search
USPC .......................................... 33/503, 556, 559
See application file for complete search history.

(56) References Cited

U.S. PATENT DOCUMENTS

| | | |
|---|---|---|
| 5,717,969 A | 2/1998 | Miyamoto et al. |
| 5,755,038 A | 5/1998 | McMurtry |
| 5,918,378 A * | 7/1999 | McMurtry ........... G01B 21/047 33/556 |
| 6,971,183 B2 | 12/2005 | Brenner et al. |
| 7,652,275 B2 | 1/2010 | Gladnick |
| 8,438,746 B2 | 5/2013 | Usui |
| 8,736,817 B2 | 5/2014 | Jones et al. |
| 9,513,458 B1 | 12/2016 | Flügge et al. |
| 2002/0158136 A1 | 10/2002 | Daniel et al. |
| 2005/0000102 A1 | 1/2005 | Christoph et al. |
| 2005/0016008 A1* | 1/2005 | Raab ................... B25J 19/0016 33/503 |
| 2007/0006473 A1* | 1/2007 | Schopf .................. G01B 5/012 33/558 |
| 2009/0140873 A1 | 6/2009 | Collingwood et al. |
| 2013/0205608 A1* | 8/2013 | Dall'Aglio ............... G01B 7/16 33/561 |
| 2013/0205609 A1* | 8/2013 | Gambini ................ G01B 7/016 33/561 |
| 2013/0212891 A1 | 8/2013 | Mariller et al. |
| 2013/0222772 A1 | 8/2013 | Matsubara |
| 2014/0111682 A1 | 4/2014 | Flügge et al. |
| 2015/0345926 A1* | 12/2015 | Bridges ................ G01B 21/045 33/502 |
| 2015/0362305 A1* | 12/2015 | Ferrari ................. G01B 21/047 33/503 |
| 2016/0084633 A1* | 3/2016 | Ferrari ................... G01B 21/04 33/503 |
| 2016/0258733 A1 | 9/2016 | Shimaoka et al. |
| 2016/0370172 A1 | 12/2016 | Christoph et al. |
| 2017/0017091 A1 | 1/2017 | Lee et al. |
| 2017/0176170 A1 | 6/2017 | Sesko |
| 2017/0176171 A1 | 6/2017 | Harsila et al. |

OTHER PUBLICATIONS

Würth Elektronik, "Your "Clear perspective" in Flex / Flex-Rigid / FR4 Semiflex," Flex-Rigid Design Guide, 2013, 21 pages.

* cited by examiner

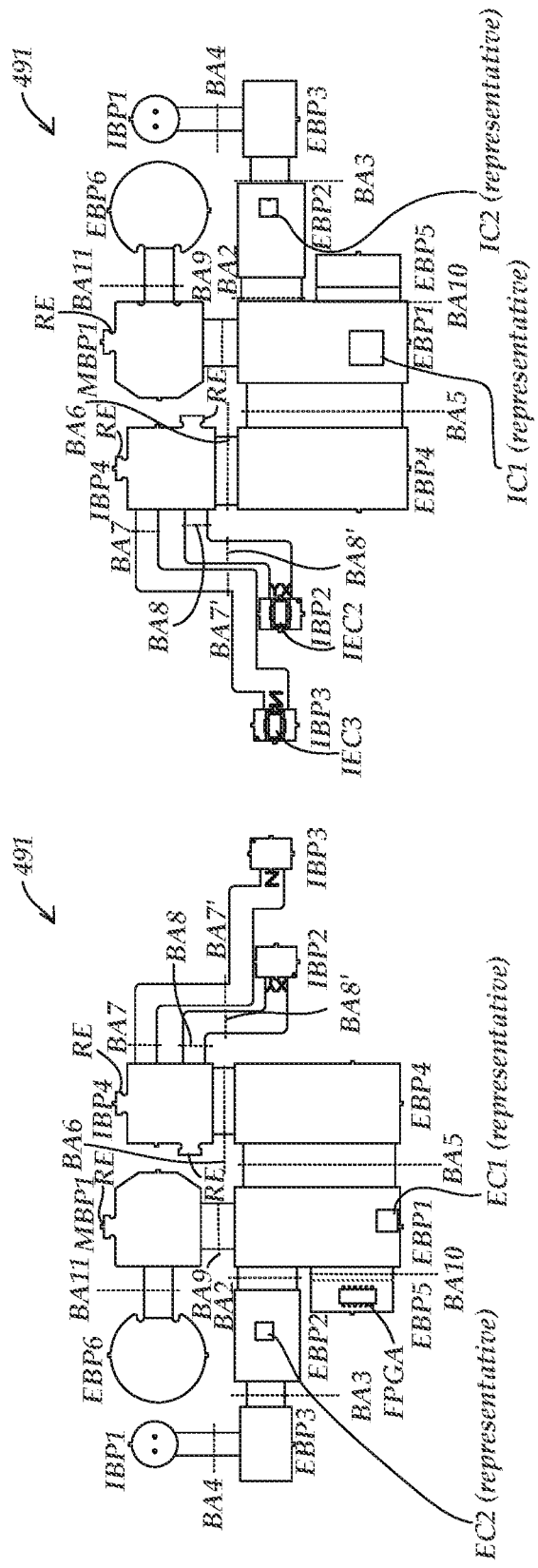

US 10,876,829 B2

COMPACT MEASUREMENT DEVICE CONFIGURATION FOR INTEGRATING COMPLEX CIRCUITS

BACKGROUND

Technical Field

This disclosure relates to precision metrology, and more particularly to compact configurations of probes used with coordinate measuring machines.

Description of the Related Art

Coordinate measurement machines (CMM's) can obtain measurements of inspected workpieces. One exemplary prior art CMM described in U.S. Pat. No. 8,438,746, which is hereby incorporated herein by reference in its entirety, includes a probe for measuring a workpiece, a movement mechanism for moving the probe, and a controller for controlling the movement. A CMM including a surface scanning probe is described in U.S. Pat. No. 7,652,275, which is hereby incorporated herein by reference in its entirety. As disclosed therein, a mechanical contact probe or an optical probe may scan across the workpiece surface.

A CMM employing a mechanical contact probe is also described in U.S. Pat. No. 6,971,183 (the '183 patent), which is hereby incorporated herein by reference in its entirety. The probe disclosed therein includes a stylus having a surface contact portion, an axial motion mechanism and a rotary motion mechanism. The axial motion mechanism includes a moving member that allows the contact portion to move in a central axis direction (also referred to as a Z direction or an axial direction) of the measuring probe. The rotary motion mechanism includes a rotating member that allows the contact portion to move perpendicular to the Z direction. The axial motion mechanism is nested inside the rotary motion mechanism. The contact portion location and/or workpiece surface coordinates are determined based on the displacement of the rotating member and the axial displacement of the axial motion moving member.

An exemplary touch probe is disclosed in U.S. Pat. No. 5,755,038 to McMurtry, which is hereby incorporated by reference in its entirety. McMurtry discloses a touch probe having a touch probe body or sensing module that releasably engages a distal stylus module. As best understood, McMurtry discloses a probe body having a central resiliently supported moving load member that extends axially between three pillars comprising a rigid supporting structure surrounding the resiliently supported moving load member. Printed circuit boards including an ASIC signal processor are mounted around the resiliently supported load member on the rigid supporting structure. The resiliently supported moving load member extends along substantially the entire length of the sensing module along its central axis, and is connected near an upper end of the rigid supporting structure to a resilient diaphragm. Three compliant struts connect the moving load member to a lower end of the rigid support structure. The struts each include a strain gauge connected to the ASIC (application-specific integrated circuit) signal processor to generate a trigger signal in response to movement of the load member relative to the rigid supporting structure. A configuration for a high precision probe which is more economical to fabricate, assemble, and repair, and which enables relatively complex circuitry to be fit into a relatively compact probe body, would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A compact coordinate measuring machine (CMM) probe configuration is provided for integrating complex circuits into a CMM probe. The CMM probe configuration includes a stylus position detection portion, a stylus suspension portion and a circuit board assembly. The stylus position detection portion includes an alignment frame and an optical sensing configuration mounted in a fixed relationship to the alignment frame. The optical sensing configuration includes at least a first light source and a first position sensitive detector. The alignment frame and the optical sensing configuration are configured to at least partially surround an interior beam path volume, and provide an opening in a distal end of the stylus position detection portion to provide access to the interior beam path volume.

The stylus suspension portion is arranged proximate to the distal end of the stylus position detection portion. The stylus suspension portion includes a suspension frame, a stylus coupling portion, a stylus motion mechanism and a first position indicating element. The suspension frame joins in a fixed relationship to the stylus position detection portion. The stylus coupling portion is configured to be rigidly coupled to a stylus. The stylus motion mechanism is attached to the suspension frame and the stylus coupling portion, and is configured to enable motion of the stylus coupling portion relative to the suspension frame. The first position indicating element is fixed relative to the stylus coupling portion and moves with the stylus coupling portion. In addition, the first position indicating element is arranged to receive light from the light source along a first source light path and output a first measurement light beam along a first measurement light path to the first position sensitive detector, wherein the first measurement light beam moves according to corresponding motion of the first position indicating element.

The circuit board assembly includes a rigid-flex circuit element and a three-dimensional carrier frame. The rigid-flex circuit element includes a set of board portions comprising at least four board portions joined by a set of bend portions comprising at least three flexible bend portions having respective bend axes. In various implementations, the bend axes of at least two of the bend portions form an angle between 60 and 120 degrees therebetween when the rigid-flex circuit element is in an approximately planar unfolded form. The three-dimensional carrier frame includes a set of support surfaces that mate to at least two board portions of the set of board portions. The rigid-flex circuit element is configured to be folded at the bend portions to locate the at least two board portions to be proximate to the corresponding support surfaces on the carrier frame. The at least two board portions are configured to be joined to the corresponding support surfaces on the carrier frame. In addition, the circuit board assembly is configured to at least partially surround a majority of the stylus position detection portion and is joined thereto with the carrier frame fixed relative to the alignment frame.

BRIEF DESCRIPTION OF THE DRAWINGS

FIGS. 5A-5C are diagrams showing a rigid-flex circuit element in an approximately planar unfolded form;

DETAILED DESCRIPTION

Figure 1:
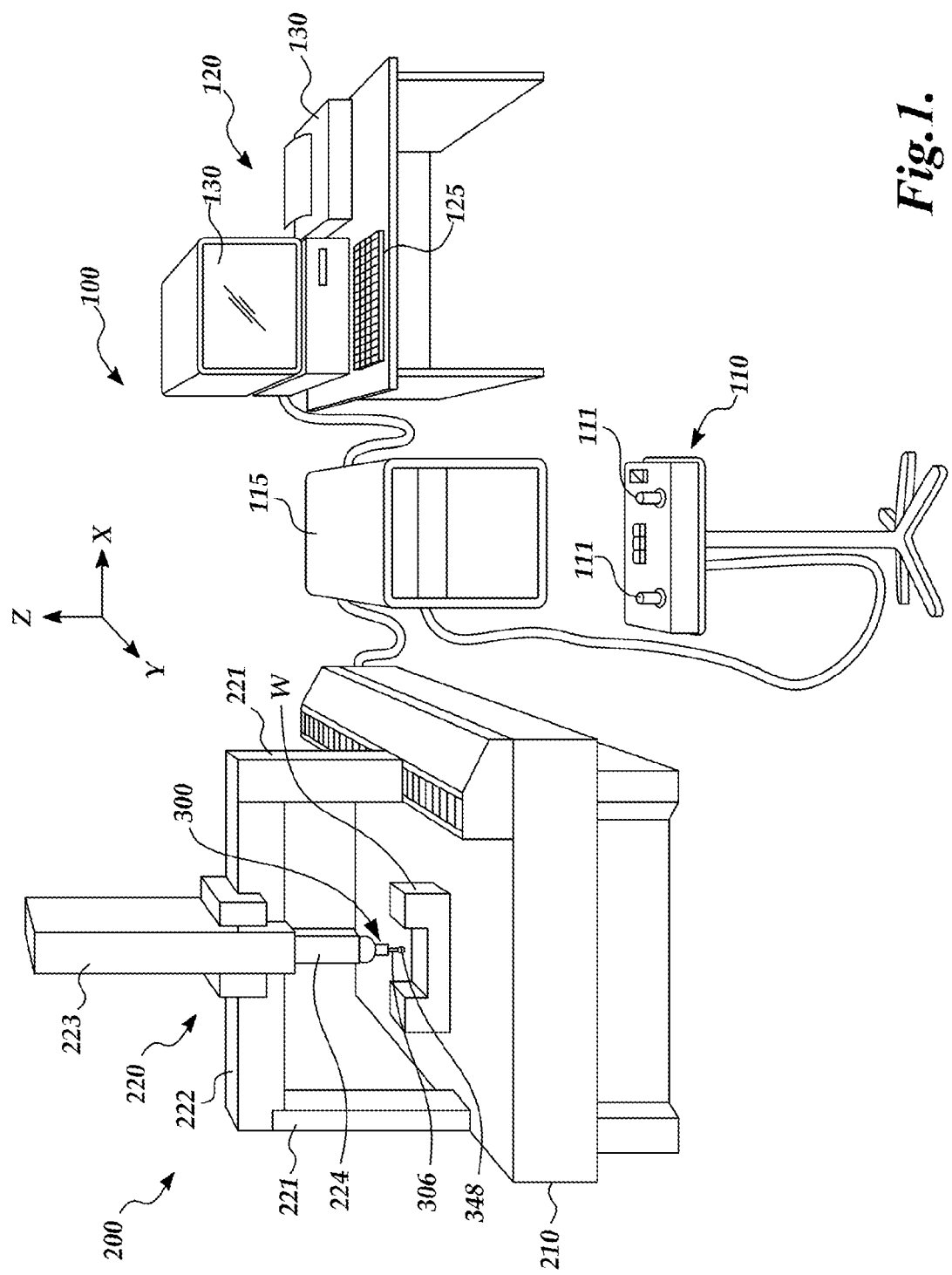
FIG. 1 is a diagram showing various typical components of a measuring system including a CMM utilizing a scanning probe such as that disclosed herein.

FIG. 1 is a diagram showing various typical components of a measuring system 100 including a CMM 200 utilizing a scanning probe 300 such as that disclosed herein. The measuring system 100 includes an operating unit 110, a motion controller 115 that controls movements of the CMM 200, a host computer 120 and the CMM 200. The operating unit 110 is coupled to the motion controller 115 and may include joysticks 111 for manually operating the CMM 200. The host computer 120 is coupled to the motion controller 115 and operates the CMM 200 and processes measurement data for a workpiece W. The host computer 120 includes input means 125 (e.g., a keyboard, etc.) for inputting, for example, measurement conditions, and output means 130 (e.g., a display, printer, etc.) for outputting, for example, measurement results.

The CMM 200 includes a drive mechanism 220 which is located on a surface plate 210, and a retention element 224 for attaching the scanning probe 300 to the drive mechanism 220. The drive mechanism 220 includes x-axis, y-axis, and z-axis slide mechanisms 222, 221, and 223, respectively, for moving the scanning probe 300 three-dimensionally. A stylus 306 attached to the end of the scanning probe 300 includes a contact portion 348. As will be described in more detail below, the stylus 306 is attached to a stylus suspension portion of the scanning probe 300, which allows the contact portion 348 to freely change its position in multiple directions when the contact portion 348 moves along a measurement path on the surface of the workpiece W.

It will be appreciated that operating at high speeds may require the two-way transmission of large amounts of data between the scanning probe 300 and the host computer system 120. In some cases, the data transmission requirements may limit the rate at which such measurements can be taken. It would be beneficial if at least some of the data generated by the scanning probe 300 were processed at the scanning probe 300, to reduce the amount of data that must be transmitted to the computer system 120. However, during high-speed operations the scanning probe 300 may be accelerated very rapidly. These high accelerations, in combination with the increased mass of signal processing electronics and the reduced structural stiffness associated with removing material in the scanning probe 300 to accommodate increased electronics, have previously limited the ability to integrate more comprehensive signal processing systems into a CMM "integrated" scanning probe 300 while retaining other desirable characteristics (e.g., sufficient mechanical stiffness, economical assembly, etc.). Implementations including a combination of features that overcome these issues and provide particular advantages are described below.

Figure 2:
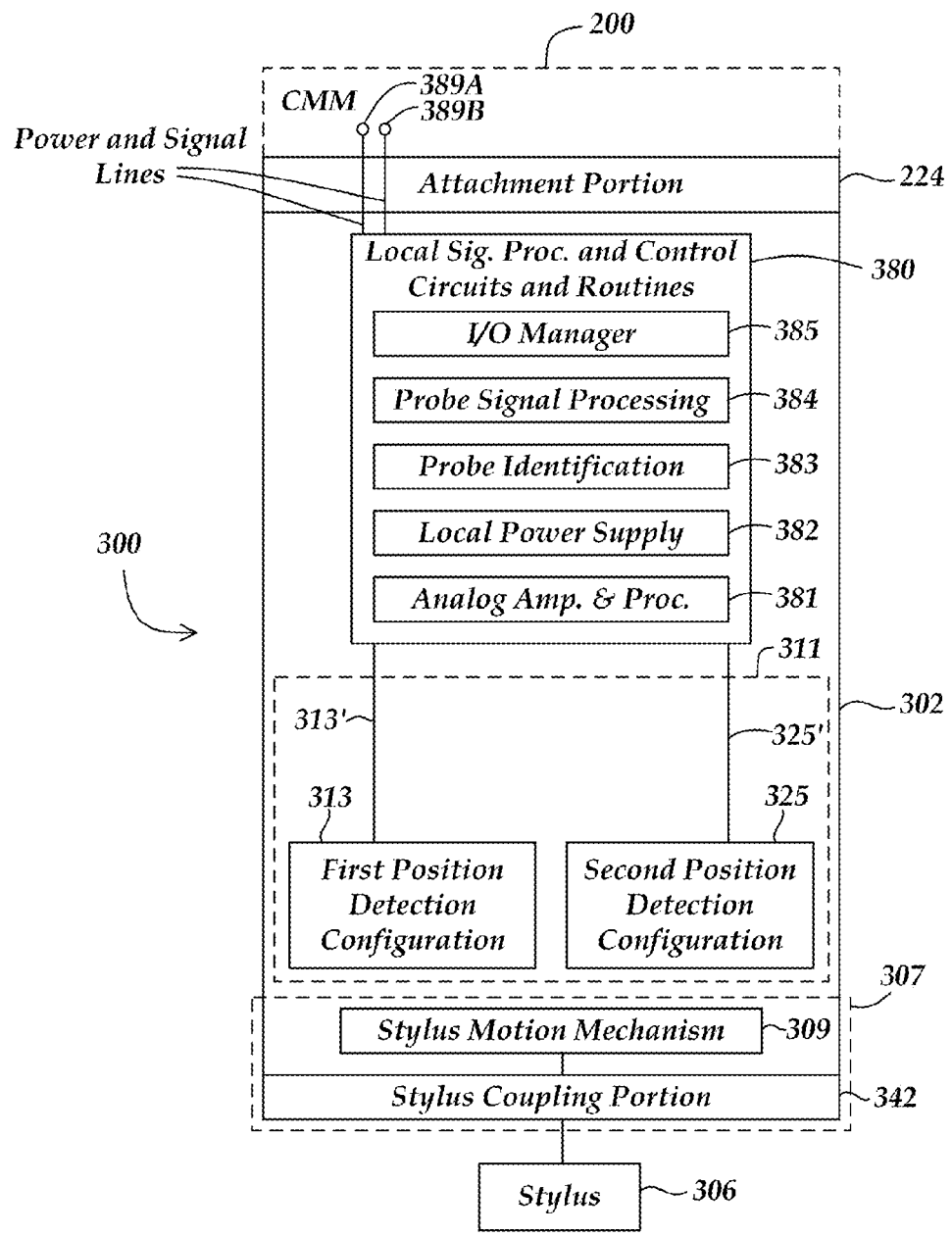
FIG. 2 is a block diagram showing various elements of a scanning probe as coupled to a CMM and providing position signals.

FIG. 2 is a block diagram showing various elements of a scanning probe 300 as coupled to a CMM 200 and providing position signals. As described above, the scanning probe 300 is coupled to the CMM 200 by a retention element 224. The scanning probe 300 includes a probe main body 302 (e.g., including a casing, etc.) which incorporates a stylus suspension portion 307, a stylus position detection portion 311, and a local signal processing and control circuits and routines portion 380. The stylus suspension portion 307 includes a stylus coupling portion 342 and a stylus motion mechanism 309. The stylus coupling portion 342 is rigidly coupled to a stylus 306. The stylus motion mechanism 309 is configured to enable various types of motion of the stylus coupling portion 342 and attached stylus 306. For example, in one implementation the stylus motion mechanism 309 may be configured to enable axial motion of the stylus coupling portion 342 and attached stylus 306 along an axial direction, and to enable rotary motion of the stylus coupling portion 342 and attached stylus 306 about a rotation center.

The stylus position detection portion 311 includes a first position detection configuration 313 and a second position detection configuration 325. The first position detection configuration 313 outputs a first set of position indicating signals 313'. In one specific example implementation, the first set of position indicating signals 313' may include at least first and second rotary signals (e.g., X and Y position signals) that are indicative of the rotary position of the stylus coupling portion 342. The second position detection configuration 325 outputs a second set of position indicating signals 325'. In one specific example implementation, the second set of position indicating signals 325' may include axial signals (e.g., Z position signals) that are indicative of the axial position of the stylus coupling portion 342 along the axial direction.

The local signal processing and control circuits and routines portion 380 may receive the first and second sets of position indicating signals 313' and 325'. In various implementations, some or all of the components/portions of the local signal processing and control circuits and routines portion 380 may be included in a circuit board assembly (e.g., as included in a rigid-flex circuit element 491 of a circuit board assembly 490, as will be described in more detail below with respect to FIGS. 5A-5C). In various implementations the local signal processing and control circuits and routines portion 380 may include an analog amplifier and processing portion 381, a local power supply portion 382, a probe identification portion 383, a probe signal processing portion 384 and an input/output manager portion 385.

In various implementations, the analog amplifier and processing portion 381 may include amplifiers and/or other components that amplify and/or otherwise process the first and second sets of position indicating signals 313' and 325'. The local power supply 382 (e.g., a battery or other local power supply and/or a power connection from the CMM over the power and signal lines 389A and 389B, etc.) may provide power for operating the components of the local signal processing and control circuits and routines portion 380 and/or for other general operations of the scanning probe 300. In various implementations, the probe identification portion 383 may store and provide identification data and/or may otherwise provide mechanisms for identifying the scanning probe 300 and/or related components. In various implementations, the proper identification of the scanning probe 300 and any interchangeable components may enable various types of functions to be performed. For example, proper identification may allow proper configuration and calibration data to be utilized in order to ensure accurate operations (e.g., with respect to processing the position indicating signals 313' and 325') and resulting measurements from the scanning probe 300 and any interchangeable components.

In various implementations, configuration and calibration data may be provided and/or utilized by the probe signal processing portion 384 for performing certain processing on the position indicating signals 313' and 325'. In various implementations, the input/output manager portion 385 may manage the signals provided to/from the scanning probe 300 (e.g., on the power and signal lines 389A and 389B). For example, in various implementations, one or more receiving portions (e.g., in the scanning probe 300, CMM 200, motion controller 115, and/or host computer 120, etc.) may receive signals (e.g., corresponding to raw or processed versions of the first and second sets of position indicating signals 313' and 325'), and one or more associated processing portions (e.g., in the scanning probe 300, CMM 200, motion controller 115, and/or host computer 120, etc.) may be utilized to determine a 3-D position of the stylus coupling portion 342 and/or of the contact portion of the attached stylus 306 as the contact portion moves along a surface of a workpiece that is being measured.

Figure 3A:
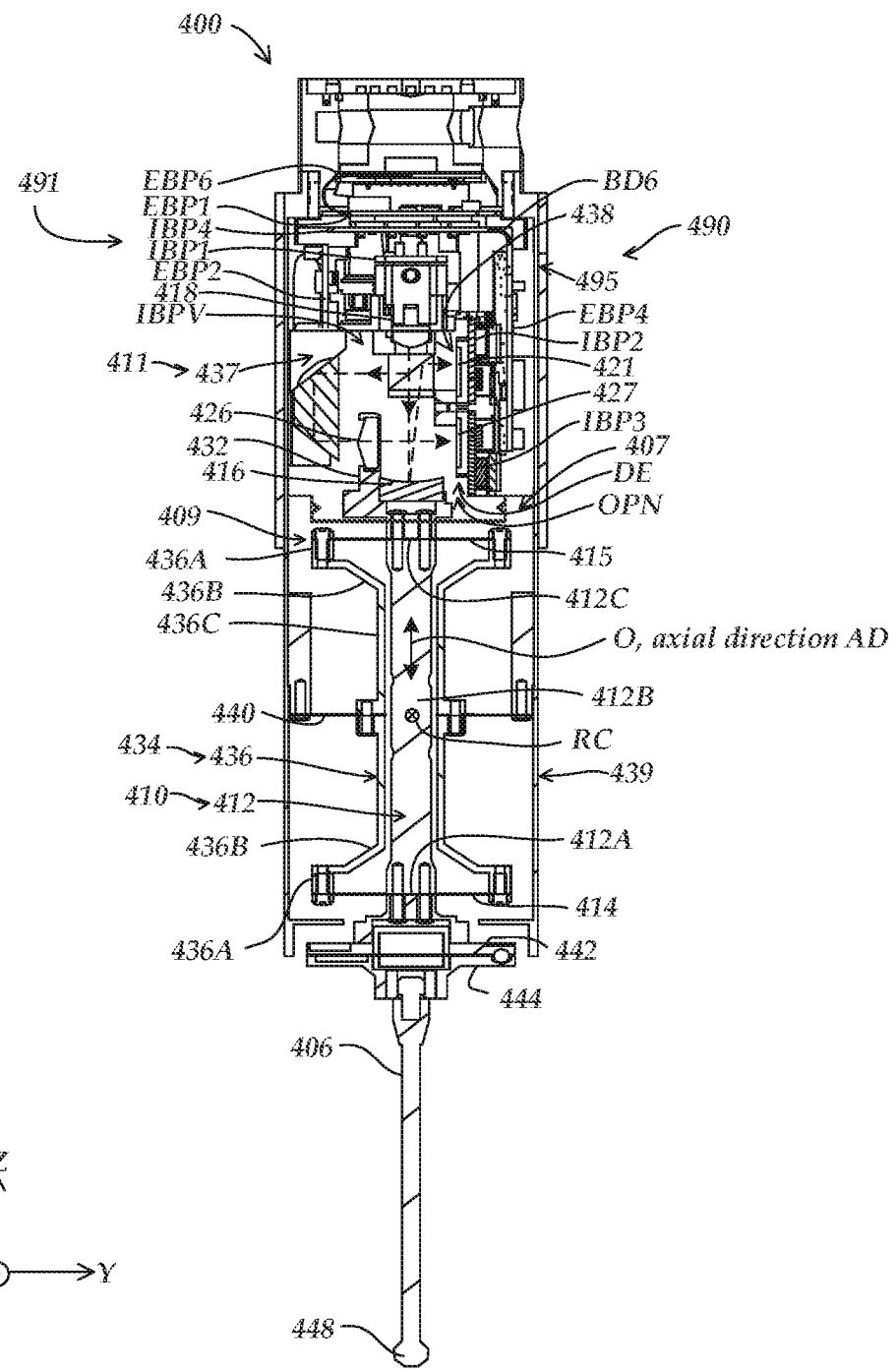
FIGS. 3A and 3B are diagrams showing cross sections of an exemplary implementation of a stylus suspension portion as coupled to a stylus and a stylus position detection portion for detecting the position of the stylus suspension portion.
Figure 3B:
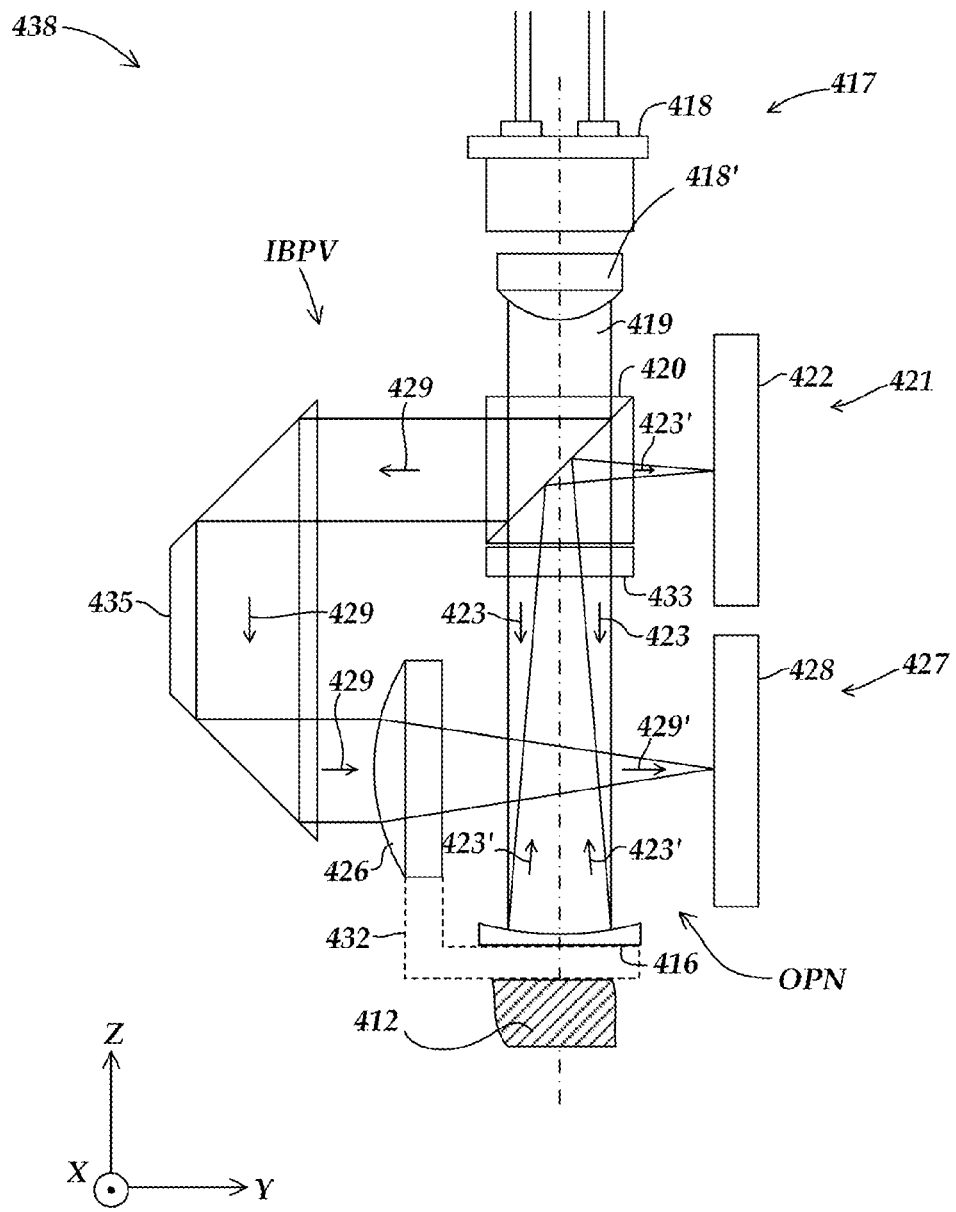

FIGS. 3A and 3B are diagrams showing cross sections of various components of a scanning probe 400 including an exemplary implementation of a stylus suspension portion 407 as coupled to a stylus 406 and a stylus position detection portion 411 for detecting the position of the stylus suspension portion 407. Various components of a similar stylus suspension portion and stylus position detection portion are described in copending and commonly assigned U.S. Patent Publication No. 2017/0176170, which is hereby incorporated herein by reference in its entirety (hereinafter the '170 publication). It will be appreciated that certain numbered components 4XX of FIGS. 3A and 3B may correspond to and/or have similar operations as similarly numbered counterpart components 3XX of FIG. 2, and may be understood by analogy thereto and as otherwise described below. This numbering scheme to indicate elements having analogous design and/or function is also applied to the following FIGS. 4-7.

As will be described in more detail below, the CMM probe configuration of the scanning probe 400 of FIG. 3A includes the stylus suspension portion 407, the stylus position detection portion 411 and a circuit board assembly 490. The stylus position detection portion 411 includes an alignment frame 437 and an optical sensing configuration 438 mounted in a fixed relationship to the alignment frame 437. As will be described in more detail below with respect to FIG. 3B, in various implementations, the optical sensing configuration 438 includes a light source 418 and position sensitive detectors 421 and 427. The alignment frame 437 and the optical sensing configuration 438 are configured to at least partially surround an interior beam path volume IBPV, and provide an opening OPN in a distal end DE of the stylus position detection portion 411 to provide access to the interior beam path volume IBPV (e.g., see FIGS. 4A and 4C). The circuit board assembly 490 includes a rigid-flex circuit element 491 and a three-dimensional carrier frame 495, as will be described in more detail below with respect to FIGS. 4-7.

As illustrated in FIG. 3A, the stylus suspension portion 407 is arranged proximate to the distal end DE of the stylus position detection portion 411, and includes a suspension frame 439, a stylus coupling portion 442, a stylus motion mechanism 409, and position indicating elements 416 and 426. The suspension frame 439 joins in a fixed relationship to the stylus position detection portion 411. In various implementations, the suspension frame 439 may mount to the alignment frame 437 using a rotationally adjustable clamping arrangement. For example, in one implementation the components that are coupled to the alignment frame 437 may initially be aligned, adjusted and/or calibrated, etc., within the alignment frame 437. Thereafter, the suspension frame 439 may be attached to the alignment frame 437, for which the alignment of the components coupled to the suspension frame 439 (e.g., the position indicating elements 416 and 426) relative to the components coupled to the alignment frame 437 (e.g., the light source 418, position sensitive detectors 421 and 427, corresponding optical paths, etc.) may be adjusted. For example, the orientation of the suspension frame 439 relative to the alignment frame 437 may be rotationally adjustable in order to properly align the attached components before fixing the position relative to one another with a clamping arrangement (e.g., utilizing a V-groove and set screws) or other type of arrangement.

In various implementations, the stylus coupling portion 442 is configured to be rigidly coupled to the stylus 406, which has a contact portion 448 for contacting a surface S of a workpiece W (not shown). The stylus motion mechanism 409 is attached to the suspension frame 439 and the stylus coupling portion 442, and is configured to enable motion of the stylus coupling portion 442 and attached stylus 406 relative to the suspension frame 439 so that the contact portion 448 can change its position along the shape of the surface S. In one specific example implementation, the stylus motion mechanism 409 is configured to enable axial and rotary motion of the stylus coupling portion 442 and attached stylus 406 so that the contact portion 448 can change its position in three directions along the shape of the surface S. For purposes of illustration, the vertical and horizontal directions on the plane of paper in FIG. 3A are defined as Z and Y directions, respectively, and the perpendicular direction to the plane of the paper is defined as the X direction. The direction of a central axis O (e.g., axial direction AD) of the measuring probe 300 coincides with the Z direction in this illustration.

The position indicating elements 416 and 426 are fixed relative to the stylus coupling portion 442 and move with the stylus coupling portion 442. As will be described in more detail below with respect to FIG. 3B, the first position indicating element 416 is arranged to receive light from the light source 418 along a first source light path 423 and output a first measurement light beam along a first measurement light path 423' to the first position sensitive detector 421, wherein the first measurement light beam moves according to corresponding motion of the first position indicating element 416. The second position indicating element 426 is arranged to receive light from the light source 418 along a second source light path 429 and output a second measurement light beam along a second measurement light path 429' to the second position sensitive detector 427, wherein the second measurement light beam moves according to corresponding motion of the second position indicating element 426.

As will further be described in more detail below with respect to FIG. 3B, in various implementations, position indicating signals from the position sensitive detector 421 in combination with position indicating signals from the position sensitive detector 427 are indicative of the position of the stylus coupling portion 442 relative to the alignment frame 437 and suspension frame 439. In various implementations, the position indicating element 416 is a rotary detection deflector and the position indicating element 426 is an axial detection deflector. In various implementations, the first position indicating element 416 and the second position indicating element 426 are rigidly coupled to one another and to the stylus coupling portion 442, and are positioned within the interior beam path volume IBPV.

As shown in FIG. 3A, the stylus motion mechanism 409 may include a moving member 412, a rotating member 436, a flexure element 440 coupled to the suspension frame 439 for supporting and enabling rotary motion of the rotating member 436, and flexure elements 414 and 415 (i.e., referenced as first flexure elements) supporting the moving member 412 and coupling it to the rotating member 436 for enabling axial motion of the moving member 412. The flexure element 440 (i.e., referenced as a second flexure element) may be disposed between the respective planes of a pair of flexure elements 414 and 415 (i.e., referenced as first flexure elements) in the axial direction O. The rotating member 436 may have a shape symmetric about the second flexure element 440 and may integrally include: two ring portions 436A; two connecting portions 436B; and a cylindrical portion 436C. Peripheral portions of the first flexure elements 414 and 415 are fixed to the ring portions 436A. The connecting portions 436B extend inside of the ring portions 436A so as to connect to the cylindrical portion 436C, which has a hollow center. The first flexure elements 414 and 415 may be disposed at a symmetric distance with respect to the second flexure element 440, although such an embodiment is intended to be exemplary only and not limiting.

An axial motion mechanism 410 including the moving member 412 is supported inside of the rotating member 436, and the rotating member 436 and the axial motion mechanism 410 together constitute a motion module that is part of the stylus motion mechanism 409. The axial motion mechanism 410 allows the contact portion 448 to move in the axial direction O. The rotary motion mechanism 434 including the rotating member 436 allows the contact portion 448 of the stylus 406 to move transverse (e.g., approximately perpendicular) to the axial direction O by means of rotary motion about the rotation center RC. As will be described in greater detail below with reference to FIG. 3B, the optical sensing configuration 438 is utilized to determine the position and/or motion of the stylus motion mechanism 409 and/or the contact portion 448 of the stylus 406.

The moving member 412 integrally includes: a lower portion 412A; a rod portion 412B; and an upper portion 412C. A bracket 432 is utilized for rigidly attaching the position indicating element 416 (e.g., a curved mirror) and a position indicating element 426 (e.g., a lens) to the upper portion 412C. The rod portion 412B is disposed between the pair of first flexure elements 414 and 415. The rod portion 412B is housed in the rotating member 436.

The lower portion 412A is formed below the rod portion 412B, and a stylus coupling portion 442 (e.g., a flange member) is attached to the lower portion 412A. A flange part 444 is provided for attachment of the stylus 406. The flange part 444 and the stylus coupling portion 442 together may constitute a detachable coupling mechanism (e.g., a known type of kinematic joint or coupling) which allows attachment and detachment between various styli 406 and the stylus coupling portion 442 with repeatable positioning (e.g., in the case of a collision knocking off a stylus, or when intentionally changing styli, etc.)

As will be described in more detail below with respect to FIGS. 5A-5C, the scanning probe 400 also includes the circuit board assembly 490 with the rigid-flex circuit element 491 and the carrier frame 495. With respect to the portions of the rigid-flex circuit element 491 shown in FIG. 3A, an interior board portion IBP1 is illustrated as connected to the light source 418. Above the interior board portion IBP1 are an interior board portion IBP4, a middle board portion MBP1, and an exterior board portion EBP6, all in an approximately stacked configuration. In the cross-sectional view of FIG. 3A, an exterior board portion EBP2 is shown on the left, and an exterior board portion EBP4 is shown on the right as connected to the interior board portion IBP4 by a bend portion BD6. In addition, an interior board portion IBP2 is illustrated as connected to the position sensitive detector 421, and an interior board portion IBP3 is illustrated as connected to the position sensitive detector 427. As will be described in more detail below, the various board portions BP (e.g., interior and exterior board portions IBP and EBP described below) of the rigid-flex circuit element 491 may include various circuitry portions and other elements (e.g., such as that of the local signal processing and control circuits and routines 380 of FIG. 2). For example, the interior board portions IBP2 and IBP3 may include amplifiers (e.g., as part of the analog amplifier and processing portion 381 of FIG. 2) for amplifying the position indicating signals from the position sensitive detectors 421 and 427, respectively.

FIG. 3B is a diagram illustrating the optical sensing configuration 438 of the stylus position detection portion 411 of FIG. 3A. As described above with respect to FIG. 3A, various components of the optical sensing configuration 438 may be fixed relative to the alignment frame 437 unless otherwise indicated. The optical sensing configuration 438 includes a light source configuration 417, a beamsplitter 420, a directing portion 435, and position sensitive detectors 421 and 427. As illustrated, the light source configuration 417 includes a light source 418 (e.g., an LED light source), and may be configured to provide a collimated or nearly collimated light beam 419 in some embodiments (e.g., using a collimating lens 418'). The beamsplitter 420 (e.g., a polarizing beamsplitter) receives and splits the light beam 419 into source light beams along source light paths 423 and 429. In an alternative implementation, a light source configuration may be utilized that includes multiple light sources and for which a beamsplitter may not be required for splitting the light into multiple paths.

The position sensitive detector 421 includes a photodetector 422 having a surface plane. In the illustrated implementation, the beam transmitted through the beamsplitter 420 travels along the source light path 423 along the axial direction to the position indicating element 416 where it is reflected. As illustrated, the light beam is reflected by the concave position indicating element 416 along a measurement light path 423' to travel back toward the beamsplitting surface of the beamsplitter 420 (which may be a polarizing beamsplitter), which reflects at least part of the light along a direction transverse to the optical axis to a position on the surface of the photodetector 422, which may be of a known type that provides signals that are related to the spot position along an X axis direction and a Y axis direction, respectively.

When the beamsplitter 420 is a polarizing beamsplitter, a quarter waveplate 433 may be located along a portion of the source light path between the beam splitting surface and the position indicating element 416. The quarter waveplate 433 changes the linear polarization from the beamsplitter to circular polarization according to known methods. The light beam reflected from the position indicating element 416 passes back though the quarter waveplate 433 and becomes linearly polarized again, with a rotated polarization such that the polarizing beamsplitter 420 will reflect all or most of the light toward the photodetector 422. Such a polarizing beamsplitter configuration may isolate the light source 418 from reflected light, and significantly improve the stylus position detection power efficiency compared to a nonpolarizing beamsplitter configuration.

As illustrated, the position sensitive detector 427 includes a photodetector 428 having a surface plane which may be approximately parallel to the surface plane of the photodetector 422. In the illustrated implementation, the split light beam is reflected from the beamsplitter 420 along a source light path 429 through a directing portion 435 (e.g., a roof or dihedral prism configuration) and toward and through the position indicating element 426 (e.g., a circular lens or a cylindrical lens). The position indicating element 426 is located with its optical axis extending along a portion of the source light path 429 that is oriented transverse to the axial direction, and it directs a transmitted beam along a measurement light path 429' toward a position on the surface plane of the photodetector 428, which may be of a known type that provides a signal that is related to the spot position along a Z axis direction.

The position indicating element 426 is coupled to the moving member of the stylus suspension portion (e.g., the moving member 412 previously described with reference to FIG. 3A). In one implementation, the position indicating element 426 and the position indicating element 416 are both attached to a bracket 432, which is coupled to the moving member. Axial motion of the moving member moves the position indicating element 426 along the axial direction transverse to its optical axis and transverse to the source light path 429 (e.g., approximately along the Z axis direction). This translation repositions the position indicating element 426 relative to the input source light path 429. The lens shape of the position indicating element 426 causes the transmitted light to refract or deflect the measurement light path 429' as a function of distance away from the optical axis of the deflector 426. Thus, the position of the resulting spot on the photodetector 428 is indicative of the axial motion of the position indicating element 426 and the moving member 412 that it is attached to.

Similarly, rotary motion of the moving member 412 moves the position indicating element 416 transverse to its optical axis and transverse to the source light path 423 (e.g., transverse to the Z axis direction). This translation repositions the position indicating element 416 relative to the input source light path 423. The concave surface of the position indicating element 416 causes the reflected light to deflect the measurement light path 423' as a function of distance away from the optical axis of the position indicating element 416. Thus, the position of the resulting spot on the photodetector 422 is indicative of the rotary motion of the position indicating element 416 and the moving member 412 that it is attached to. In various implementations, the concave surface of the position indicating element 416 may be shaped to provide a desired "deflection relationship" for the reflected light detected by the photodetector 422. Such a configuration may have various advantages (e.g., allowing for a miniaturization of the photodetector 422, allowing for a larger range of styluses with different lengths to be utilized, etc.).

Various trigonometric and/or other equations may be utilized for determining/representing the correlations between the movements of the resulting spots on the photodetectors 422 and 428 and the rotary and axial motions of the position indicating elements 416 and 426, as described in more detail in the previously incorporated '170 publication. In various implementations, the position indicating signals from the photodetector 422 in combination with position indicating signals from the photodetector 428 are thus indicative of the position of the moving member 412 and attached stylus coupling portion 442 (e.g., relative to the alignment frame 437, the suspension frame 439, etc.).

In various implementations, one or both of the position indicating elements 416 and 426 may be configured to extend into the interior beam path volume IBPV through the opening OPN in the distal end DE (e.g., see FIGS. 4A and 4C) of the stylus position detection portion 411. With regard to such configurations, one or both of the source light paths 423 and 429, and one or both of the corresponding measurement light paths 423' and 429', may be contained entirely in the interior beam path volume IBPV. In some implementations, one or both of the position indicating elements 416 and 426 may be located outside of the interior beam path volume IBPV. In such configurations, one or both of the source light paths 423 and 429, and one or both of the corresponding measurement light paths 423' and 429', may extend through the opening OPN in the distal end DE of the stylus position detection portion 411.

Figure 4B:
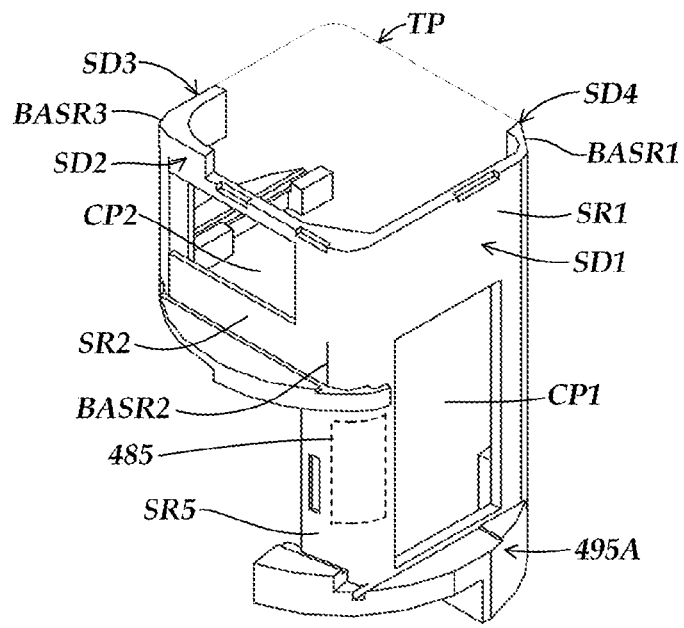
FIGS. 4A-4C are diagrams showing the stylus position detection portion and a carrier frame section.
Figure 4A:
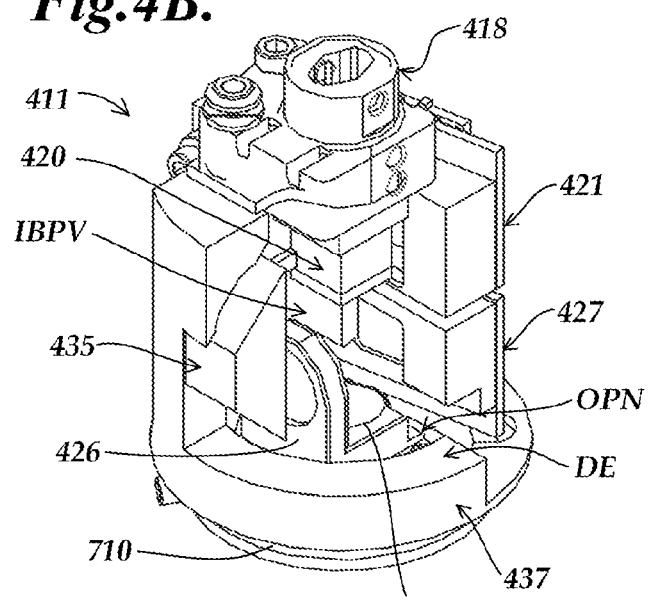
Figure 4C:
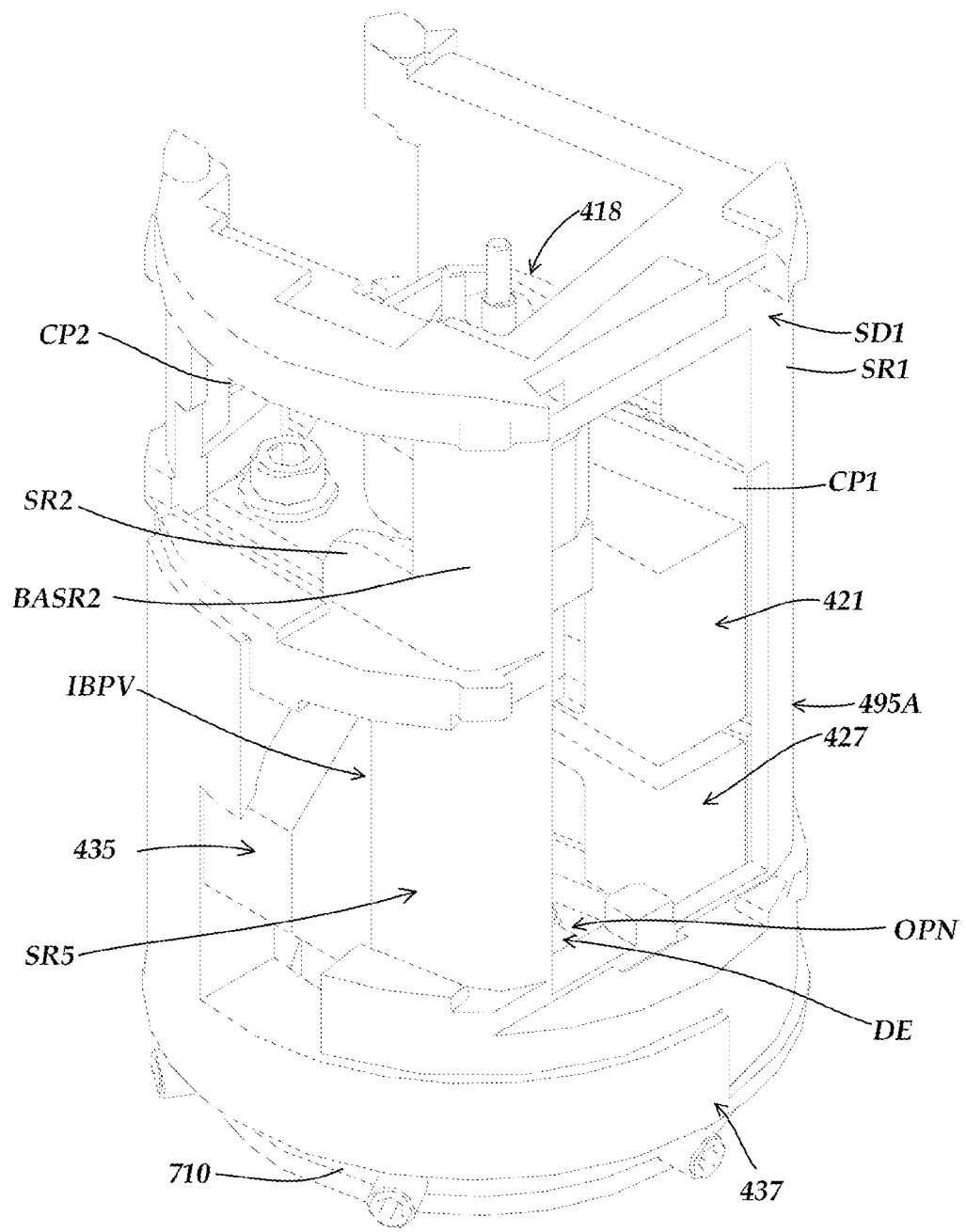

FIGS. 4A-4C are diagrams showing the stylus position detection portion 411 and a carrier frame section 495A. As shown in FIG. 4A, the stylus position detection portion 411 includes the alignment frame 437 and the optical sensing configuration 438 mounted in a fixed relationship to the alignment frame 437. More specifically, the alignment frame 437 includes surfaces to which components of the optical sensing configuration 438 (e.g., as described above with respect to FIG. 3B) are mounted. For example, the light source 418, beamsplitter 420, position sensitive detectors 421 and 427, and directing portion 435 (e.g., a roof or dihedral prism configuration) may all be mounted in a fixed relationship to the alignment frame 437. As noted above, the alignment frame 437 and the optical sensing configuration 438 are configured to at least partially surround the interior beam path volume IBPV, and provide an opening OPN in a distal end DE of the stylus position detection portion 411 to provide access to the interior beam path volume IBPV.

As will be described in more detail below, in various implementations, the alignment frame 437 of FIG. 4A may be attached or otherwise fixed relative to the carrier frame section 495A of FIG. 4B (e.g., as illustrated in the configuration of FIG. 4C). Before the carrier frame section 495A is attached to the alignment frame 437, it may be desirable for the components (e.g., of the optical sensing configuration 438) that are coupled to the alignment frame 437 to initially be mounted, aligned, adjusted and/or calibrated, etc., within the alignment frame 437. More specifically, it may be desirable to initially have the spacing and access to the interior/exterior portions of the alignment frame 437 and attached components be available for mounting, aligning, adjusting, calibrating, etc., the components without the carrier frame section 495A being in the way or otherwise attached. Thereafter, the carrier frame section 495A may be attached to the alignment frame 437, as will be described in more detail below with respect to FIG. 4C.

As shown in FIG. 4B, the carrier frame section 495A includes various support surfaces SR on sides SD1-SD4 of the carrier frame section 495A (e.g., to which various board portions BP of the rigid flex circuit element 491 may be mated). With respect to the view illustrated in FIG. 4B, a support surface SR1 is shown on the side SD1, and support surfaces SR2 and SR5 are shown on the side SD2. As will be described in more detail below with respect to FIGS. 5-6, during assembly, an exterior board portion EBP1 may be mated to the support surface SR1, an exterior board portion EBP2 may be mated to the support surface SR2, and an exterior board portion EBP5 may be mated to the support surface SR5. In various implementations, the sides SD3 and SD4 of the carrier frame 495 may include additional support surfaces (e.g., support surfaces SR3 and SR4 that are not visible in the view of FIG. 4B), to which exterior board portions EBP3 and EBP4 may be mated, respectively.

As illustrated in FIG. 4B, the support surfaces SR1 and SR2 include cutout portions CP1 and CP2, respectively. As will be described in more detail below with respect to FIGS. 5-6, at least some of the board portions (e.g., board portions EBP1 and EBP2) may include at least one electronic component located on an exterior side of the board portion and at least one electronic component located on an interior side of the board portion. The electronic components on the interior sides of the board portions may extend through the respective cutout portions when the board portions are mated to the respective support surfaces.

In various implementations, the carrier frame 495 may be made to include additional carrier frame sections that are added to the carrier frame section 495A as part of the assembly process. For example, as will be described in more detail below with respect to FIG. 6B, additional carrier frame sections 495B and 495C may be added over the top TP of the carrier frame section 495A in consecutive layers. Such additional carrier frame sections 495B and 495C may include support surfaces TSR1 and TSR2 that are oriented transverse to the Z axis and that support board portions that thus may also be oriented transverse to the Z axis. As another example of a board portion BP oriented transverse to the Z axis, as part of the assembly process a board portion may be mounted and attached to the light source 418, as thus supported by an upper surface of the stylus position detection portion 411.

In various implementations, the carrier frame section 495A may include rounded bend axis support regions BASR. For example, a rounded bend axis support region BASR2 is illustrated at the transition between the sides SD1 and SD2, and is correspondingly located at the transition between the support surfaces SR1 and SR2. As further examples, rounded bend axis support regions BASR1 and BASR3 are similarly illustrated at the transitions between the sides SD4 and SD1, and SD2 and SD3, respectively. As will be described in more detail below with respect to FIGS. 5-6, respective bend portions BD of the rigid flex circuit element 491 may be located proximate to (e.g., may be bent around) the respective rounded bend axis support regions BASR when the rigid-flex circuit element 491 is folded at the bend portions BD to locate at least some of the board portions BP to be proximate to the corresponding support surfaces SR on the carrier frame 495.

FIG. 4C is a diagram of stylus position detection portion 411 including the alignment frame 437 of FIG. 4A as attached to the carrier frame section 495A of FIG. 4B. As will be described in more detail below with respect to FIGS. 5-6, in various implementations, the circuit board assembly 490 is configured to at least partially surround a majority of the stylus position detection portion 411 and is joined thereto with the carrier frame 495 fixed relative to the alignment frame 437. As noted above, in one implementation various components (e.g., of the optical sensing configuration 438) may be mounted, aligned, adjusted and/or calibrated, etc., within the alignment frame 437 before the carrier frame section 495A is attached. As will be described in more detail below with respect to FIGS. 5-6, in various implementations, the rigid flex circuit element 491 may be attached to the carrier frame section 495A before or after the carrier frame section 495A is attached to the alignment frame 437. In various implementations, the additional carrier frame sections 495B and 495C may also be attached to the carrier frame section 495A to form the carrier frame 495 before or after the carrier frame section 495A is attached to the alignment frame 437. In various implementations, one or more of the support surfaces SR of the carrier frame 495 may abut one or more surfaces of the alignment frame 437 when the carrier frame 495 is attached to the alignment frame 437.

In various implementations, the carrier frame 495 may consist of an electrically insulating material that does not electronically couple to the conductive elements on the rigid-flex circuit element 491 or other elements so as to avoid electrical shorting and other related issues. In addition, the carrier frame 495 may further include at least one of integral spacers or insulating ribs that guide a metallic housing (e.g., a casing that is included as part of an external portion of the probe main body 302 of FIG. 2) into position on the CMM probe configuration during its assembly and prevent contact between any non-grounded conductive elements on the rigid-flex circuit element 491 and the assembled metallic housing. As another example, in the implementations shown in FIGS. 4A-4C, and FIG. 6A, the carrier frame sections 495A, 495B, and 495C may function as integral spacers, and a portion of the carrier frame section 495A may serve as an insulating rib 485.

Figure 5A:
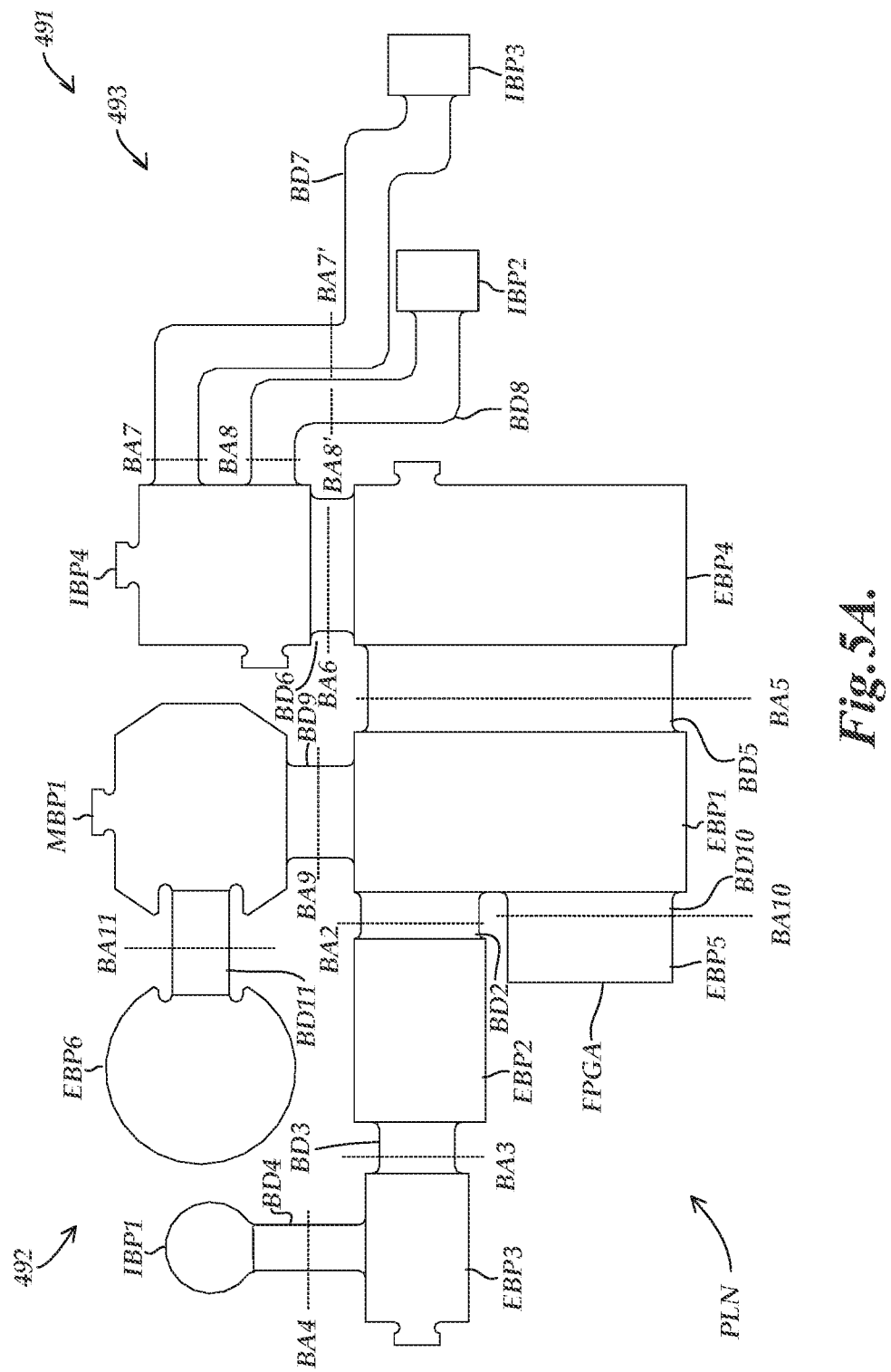

FIGS. 5A-5C are diagrams showing a rigid-flex circuit element 491 in an approximately planar unfolded form PLN. As illustrated, the rigid-flex circuit element 491 includes a set of board portions 492 comprising individual board portions BP joined by a set of bend portions 493 including individual flexible bend portions BD having respective bend axes BA. More specifically, the set of board portions 492 includes exterior board portions EBP1-EBP6, a middle board portion MBP1, and interior board portions IBP1-IBP4. The set of bend portions 493 includes bend portions BD1-BD11 with respective bend axes BA1-BA11.

As described above with respect to FIGS. 4B and 4C, the carrier frame 495 includes a set of support surfaces SR that mate to at least some of the board portions BP of the set of board portions 492. As will be described in more detail below, the rigid-flex circuit element 491 is configured to be folded at the bend portions BD to locate at least some of the board portions BP to be proximate to the corresponding support surfaces SR on the carrier frame 495. In various implementations, at least some of the board portions BP are configured to be joined to the corresponding support surfaces SR on the carrier frame 495 (e.g., by one or more of retention elements, bonding, etc.). In various implementations, the carrier frame 495 may include board portion retention elements RE (e.g., groove portions for coupling to corresponding retention elements RE, such as tabs, on the board portions) that capture and hold board portions BP proximate to corresponding support surfaces SR on the carrier frame 495.

In various implementations, the bend axes BA of at least some of the bend portions BD may form an angle between 60 and 120 degrees therebetween (e.g., in some configurations at least some of the bend axes BA may be approximately orthogonal to one another) when the rigid-flex circuit element 491 is in an approximately planar unfolded form PLN (e.g., as illustrated in FIGS. 5A-5C). In the example configuration of FIGS. 5A-5C, the bend axes BA2, BA3, BA5, BA7, BA8, BA10 and BA11 are all approximately parallel to one another, and are all approximately orthogonal to the bend axes BA4, BA6, BA7', BA8' and BA9.

In various implementations, the set of board portions 492 includes at least one interior board portion IBP and at least one exterior board portion EBP, and when the rigid-flex circuit element 491 is folded at the bend portions BD, the at least one interior board portion IBP is located proximate to a corresponding support surface SR on the carrier frame 495, and the at least one interior board portion IBP and the at least one exterior board portion EBP are located approximately parallel to one another and at least partially overlapping with one another along a direction approximately normal to the at least one exterior board portion EBP, as well as the at least one interior board portion IBP and the corresponding support surface SR on the carrier frame 495. For example, as will be described in more detail below with respect to FIG. 6A, the interior board portion IBP4 and the exterior board portion EBP6 may meet such criteria when the rigid-flex circuit element 491 is folded at the bend portions BD. As another example, the interior board portions IBP2 and IBP3 and the exterior board portion EBP4 may also meet such criteria when the rigid-flex circuit element 491 is folded at the bend portions BD.

In various implementations, the set of board portions 492 includes at least one connector board portion BP that electronically connects to at least one electronic component that is fixed to the alignment frame 437. For example, the interior board portion IBP1 may be designated as a connector board portion that electronically connects to the light source 418 that is fixed to the alignment frame 437. As another example, the interior board portions IBP2 and IBP3 may be designated as connector board portions that electronically connect to the position sensitive detectors 421 and 427, respectively, that are fixed to the alignment frame 437, and for which the connector board portions IBP2 and IBP3 may include signal amplifiers that amplify the outputs from the position sensitive detectors 421 and 427. In various implementations, the rigid-flex circuit element 491 includes a connection element that is configured to provide programmable access to the scanning probe 300. For example, the exterior board portion EBP5 includes a field programmable gate array FPGA mounted thereon (e.g., to allow for external programming, etc., of the rigid-flex circuit element 491 after assembly is complete, etc.)

FIGS. 5B and 5C illustrate front and back views, showing exterior and interior sides for the board portions BP of the rigid-flex circuit element 491. As shown by a comparison between FIGS. 5B and 5C, at least some of the board portions BP include electronic components on both the exterior and interior sides. As described above with respect to FIG. 4B, in some instances the electronic components on the interior sides of the board portions may extend through respective cutout portions CP in the respective support surfaces SR of the carrier frame 495 when the board portions BP are mated to the respective support surfaces SR. As an example, in various implementations, the exterior board portion EBP1 includes one or more electronic components EC1 on the exterior side of the board portion and one or more electronic components IC1 on the interior side of the board portion (e.g., as extending through the cutout portion CP1 when assembled). As another example, in various implementations, the exterior board portion EBP2 includes one or more electronic components EC2 on the exterior side of the board portion and one or more electronic components IC2 on the interior side of the board portion (e.g., as extending through the cutout portion CP2 when assembled). As another example of electronic components on the interior sides of board portions, in FIG. 5C the interior board portions IBP2 and IBP3 are shown to include interior electronic connectors IEC2 and IEC3 for connecting to the position sensitive detectors 421 and 427, respectively.

As further illustrated in FIGS. 5B and 5C, at least some of the board portions BP may include retention elements RE (e.g., for attaching to corresponding retention elements RE on the carrier frame 495, etc.) For example, a tab and groove configuration may be utilized, wherein a retention element RE on a board portion may consist of a tab that "snaps" into a corresponding retention element RE (e.g., a correspondingly shaped groove) in a carrier frame section. As another example, a bonding mechanism may be utilized for attaching at least some of the board portions BP to the carrier frame 495.

It will be appreciated that the rigid-flex circuit element 491 in the approximately planar unfolded form PLN is able to be created utilizing conventional PCB manufacturing and assembly techniques. In addition, conventional testing of the circuitry, etc., may be performed while the rigid-flex circuit element 491 is in the approximately planar unfolded form PLN. As will be described in more detail below with respect to FIGS. 6A and 6B, the rigid-flex circuit element 491 may then be folded for insertion as part of the scanning probe 300. In various implementations, the multi-faceted shape of the rigid-flex circuit element 491 allows the necessary electrical components to be fit on the board portion panels, while still being able to fit into a relatively compact probe diameter (e.g., within a 25 mm to 30 mm diameter cylinder for a scanning probe 300 in certain specific example implementations, such as within a 27.2 mm diameter cylinder).

The complex signal processing system of the rigid-flex circuit element 491 is able to provide an unprecedented scope of signal processing operations within such a scanning probe, while using economical non-custom components. In various implementations, the rigid-flex circuit element 491 may be able to perform a significant portion, or all of, the processing of the position indicating signals from the position sensitive detectors 421 and 427 (e.g., to determine a motion and/or 3-D position of the contact portion 448 of the stylus 406). In one implementation, the set of board portions of the rigid-flex circuit element 491 comprises a processing portion that processes the first set of position indicating signals from the first position sensitive detector 421 and the second set of position indicating signals from the second position sensitive detector 427 to determine the 3-D position of the contact portion 448 of the stylus 406.

Figure 6A:
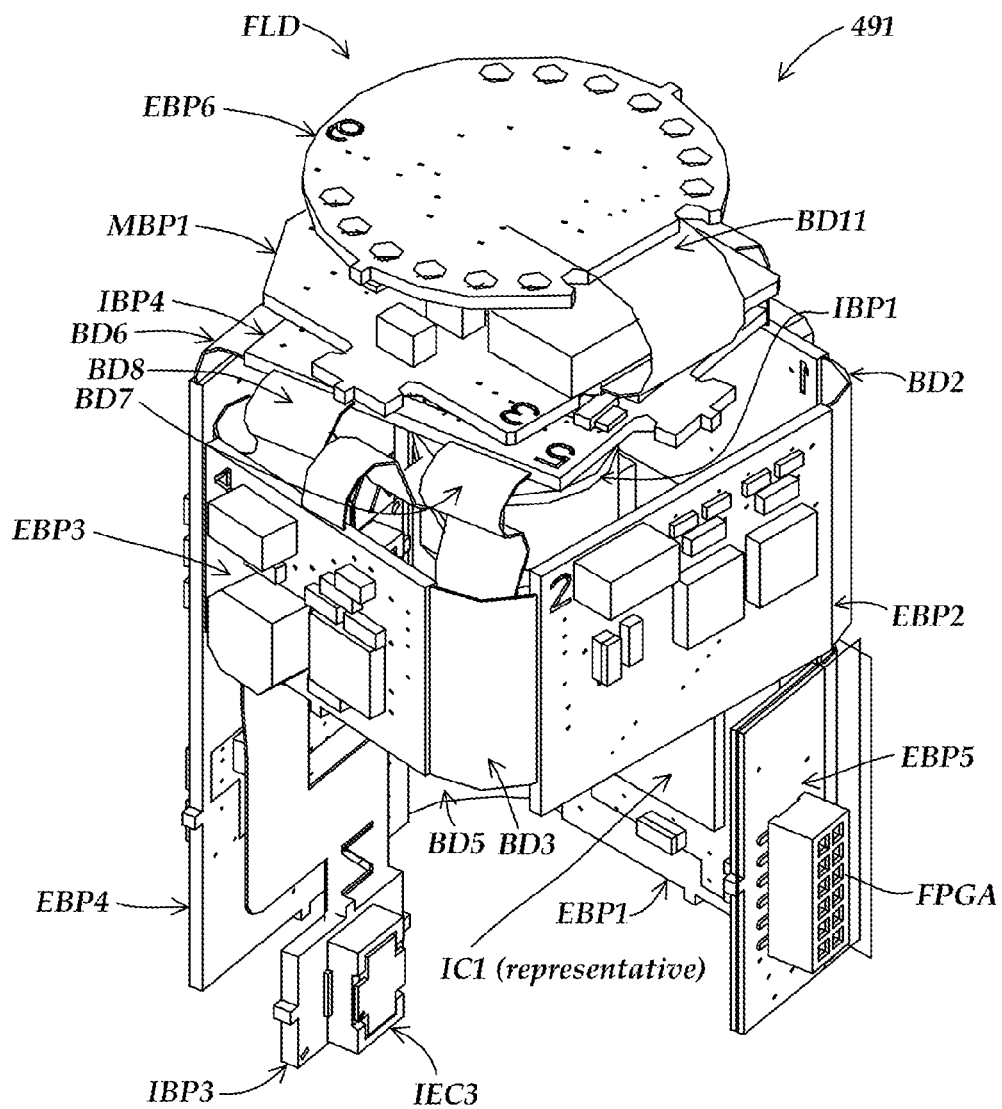
FIGS. 6A and 6B are diagrams showing the rigid-flex circuit element of FIGS. 5A-5C in a folded form as attached around the carrier frame and stylus position detection portion of FIGS. 4A-4C.
Figure 6B:
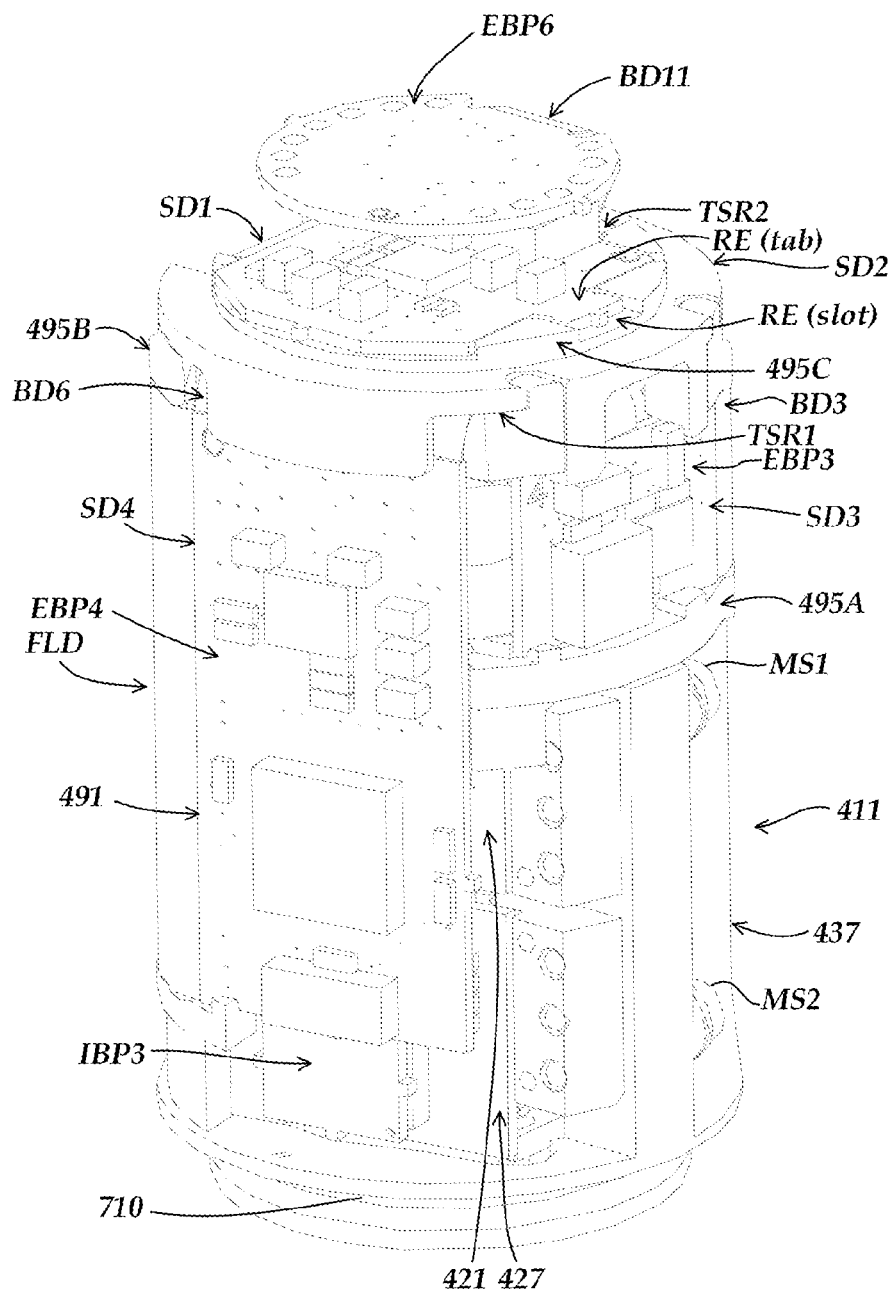

FIGS. 6A and 6B are diagrams showing the rigid-flex circuit element 491 in a folded form FLD (e.g., as attached around the three-dimensional carrier frame 495 and stylus position detection portion 411). The carrier frame 495 and stylus position detection portion 411 are not shown in FIG. 6A so as to better illustrate the locations of the various board portions BP of the rigid-flex circuit element 491 in the folded form, and an assembled version including the carrier frame 495 and stylus position detection portion 411 is illustrated in FIG. 6B. In one specific example implementation, the folding of the rigid-flex circuit element 491 may include the following sequence.

The folding process may begin with the positioning of the exterior board portion EBP1 (e.g., on the support surface SR1 on side SD1 of the carrier frame section 495A of FIGS. 4B and 4C). The bend portion BD2 may then be bent 90 degrees around the bend axis BA2 as part of positioning the exterior board portion EBP2 (e.g., on the support surface SR2 on side SD2 of the carrier frame section 495A). The bend portion BD3 may then be bent 90 degrees around the bend axis BA3 as part of positioning the exterior board portion EBP3 (e.g., on the support surface SR3 on side SD3 of the carrier frame section 495A). The bend portion BD4 may then be bent 90 degrees around the bend axis BA4 as part of positioning the interior board portion IBP1 (e.g., for attachment to the light source 418 as attached to the alignment frame 437).

From the already positioned exterior board portion EBP1 (e.g., as positioned on the support surface SR1 on side SD1 of the carrier frame section 495A), the bend portion BD5 may be bent loosely 90 degrees around the bend axis BA5 as part of loosely positioning the exterior board portion EBP4 (e.g., to be proximate to the support surface SR4 on side SD4 of the carrier frame section 495A). The bend portion BD6 may then be bent loosely 90 degrees around the bend axis BA6 as part of loosely positioning the interior board portion IBP4 (e.g., to be approximately over the top of the carrier frame section 495A). The bend portions BD7 and BD8 may then be bent 90 degrees around the respective bend axes BA7 and BA8 (e.g., to be threaded under the exterior board portion EBP3), and then bent again 90 degrees around the respective bend axes BA7' and BA8' (e.g., to be threaded under the exterior board portion EBP4), as part of positioning the interior board portions IBP2 and IBP3 (e.g., for attachment to the position sensitive detectors 421 and 427, respectively, as attached to the alignment frame 437). In FIG. 6B, mounting screws MS1 and MS2 are shown as having been used for attaching the position sensitive detectors 421 and 427 to the alignment frame 437. The exterior board portion EBP4 may then be fully positioned (e.g., joined, fixed, etc.) onto the support surface SR4 on side SD4 of the carrier frame section 495A.

A carrier frame section 495B may then be attached over the top of the carrier frame section 495A, and may provide an upper support surface TSR1 that is oriented transverse to the Z axis. The interior board portion IBP4 may then be fully positioned as oriented transverse to the Z axis (e.g., fixed onto the support surface TSR1 on the carrier frame section 495B as attached over the top of the carrier frame section 495A). A carrier frame section 495C may then be attached over the top of the carrier frame section 495B, and may provide an upper support surface TSR2 that is oriented transverse to the Z axis. From the already positioned exterior board portion EBP1 (e.g., as positioned on the support surface SR1 on side SD1 of the carrier frame section 495A), the bend portion BD9 may then be bent 90 degrees around the bend axis BA9 as part of positioning the middle board portion MBP1 as oriented transverse to the Z axis (e.g., as fixed onto the support surface TSR2 on the carrier frame section 495C as attached over the top of the carrier frame section 495B).

As illustrated in FIG. 6B and as described above, in one implementation a retention element RE (e.g., a tab) on the middle board portion MBP1 may be utilized for the attachment to a corresponding retention element RE (e.g., a corresponding groove) on the carrier frame section 495C. As other examples, a bonding mechanism, or other attachment configurations, may also or alternatively be utilized for the attachment. It will be appreciated that, in various implementations, other board portions BP may similarly be attached to any of the corresponding carrier frame sections 495A, 495B or 495C, and that the carrier frame sections may similarly be attached to one another.

From the already positioned middle board portion MBP1, the bend portion BD11 may then be bent 180 degrees around the bend axis BA11 as part of positioning the external board portion EBP6. In various implementations, the board portions EBP6, MBP1, IBP4 and IBP1 may thus essentially be in a type of stacked configuration as all oriented transverse to the Z axis (e.g., as illustrated near the top of the scanning probe configuration of FIG. 3A).

In various implementations, the circuitry/programming of the board portions BP may perform certain functions relative to the components that the board portions BP are connected to. For example, the external board portion EBP6 may correspond to a type of auto joint connector for the scanning probe 300, for providing certain communication/control/power connections for the scanning probe 300, and along with the attached middle board portion MBP1 (and other coupled board portions) may include circuitry/programming corresponding to certain functions of the input/output manager portion of 385 of FIG. 2. The interior board portion IBP1 may connect to the light source 418, for which the exterior board portion EBP3 (and other coupled board portions BP) may include circuitry/programming for certain lighting control/power functions. The interior board portions IBP2 and IBP3, along with the attached interior board portion IBP4 (and other coupled board portions), may include circuitry/programming (e.g., including analog amplifiers) corresponding to the operations/signal processing for the position sensitive detectors 421 and 427, and may correspond to certain functions of the analog amplifier and processing portion 381 and/or probe signal processing 384 of FIG. 2.

Figure 7:
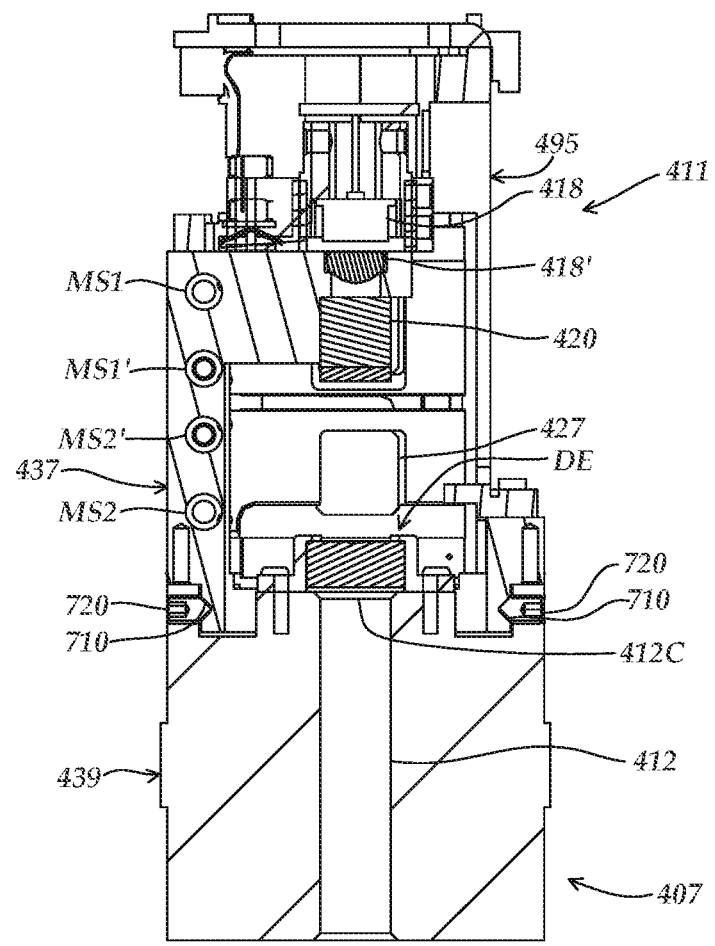
FIG. 7 is a diagram showing a cross section of an exemplary implementation of a stylus suspension portion including a suspension frame as coupled to an alignment frame.

FIG. 7 is a diagram showing a cross section of an exemplary implementation of a stylus suspension portion 407 including a suspension frame 439 as coupled to an alignment frame 437. In various implementations, the stylus suspension portion 407 is arranged proximate to the distal end DE of the stylus position detection portion 411 that includes the alignment frame 437. In various implementations, the suspension frame 439 is coupled rigidly and releasably to the alignment frame 437. As will be described in more detail below, in various implementations, the suspension frame 439 mounts to the alignment frame 437 using a rotationally adjustable clamping arrangement.

In one specific example implementation, the bottom of the alignment frame 437 includes a V-groove 710 that is utilized for the attachment of the suspension frame 439. More specifically, set screws 720 that are attached to the suspension frame 439 extend into the V-groove of the alignment frame 437 and may thus be utilized to clamp the suspension frame 439 to the alignment frame 437 once a desired rotational orientation is achieved. This configuration allows the suspension frame 439 to be rotated relative to the alignment frame 437 when the set screws 720 are not fully tightened, which allows the rotational orientation to be adjusted until the desired orientation is achieved. As described above with respect to FIG. 3A, in various implementations, it may be desirable to perform such rotational adjustment so as to be able to properly align the components coupled to the suspension frame 439 (e.g., the position indicating elements 416 and 426) relative to the components coupled to the alignment frame 437 (e.g., the light source 418, position sensitive detectors 421 and 427, corresponding optical paths, etc.). As an example of the attachment of some of the components to the alignment frame 437, as shown in FIG. 7, mounting screws MS1, MS1', MS2 and MS2' are utilized for attaching the position sensitive detectors 421 and 427 to the alignment frame 437.

Figure 8:
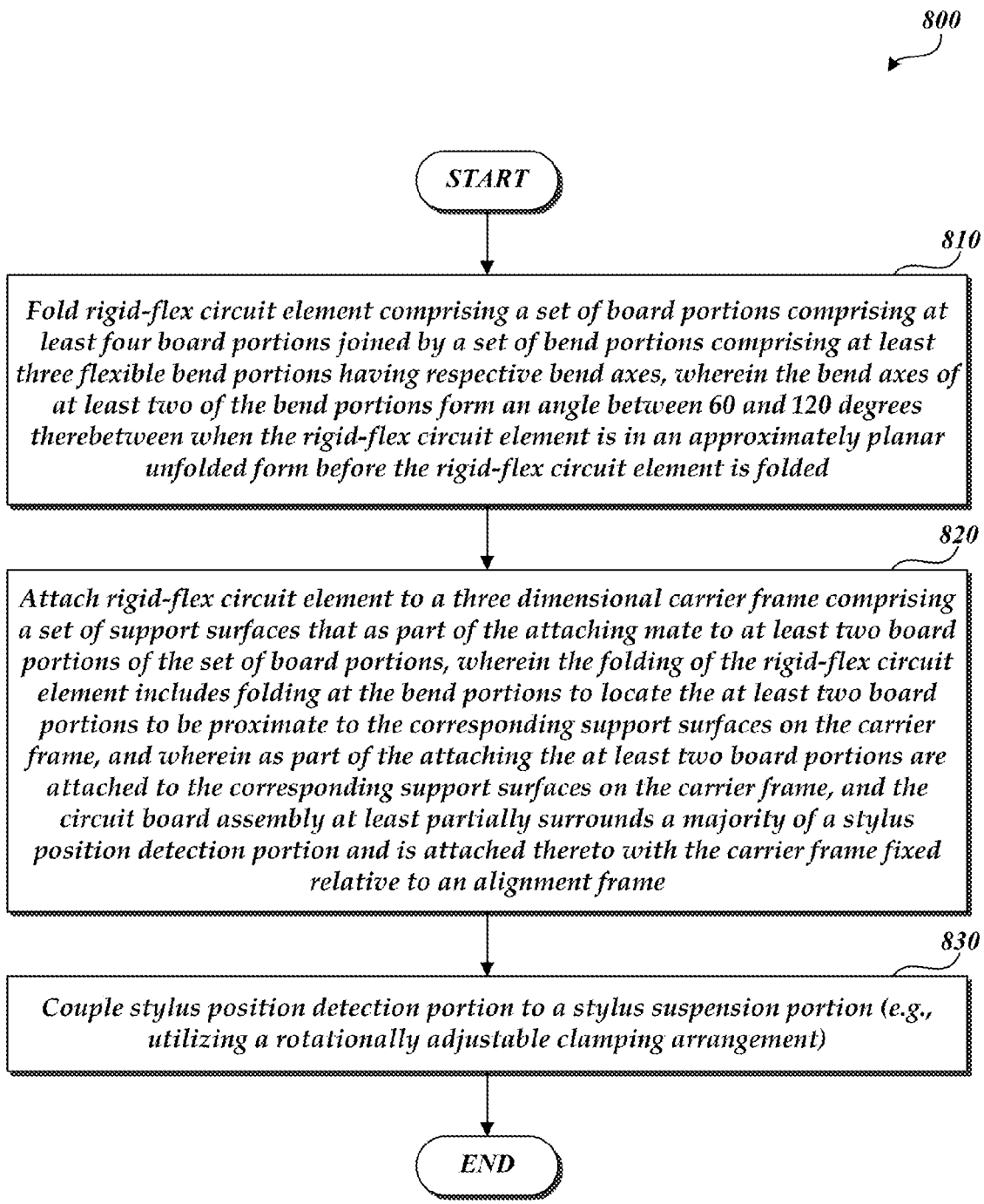
FIG. 8 is a flow diagram illustrating one exemplary implementation of a method for assembling a scanning probe for use with a CMM.

FIG. 8 is a flow diagram illustrating one exemplary implementation of a routine 800 for assembling a scanning probe for use with a coordinate measuring machine (CMM). At a block 810, a rigid-flex circuit element is folded, the rigid flex circuit element comprising a set of board portions comprising at least four board portions joined by a set of bend portions comprising at least three flexible bend portions having respective bend axes. In addition, the bend axes of at least two of the bend portions form an angle between 60 and 120 degrees therebetween when the rigid-flex circuit element is in an approximately planar unfolded form before the rigid-flex circuit element is folded.

At a block 820, the rigid-flex circuit element is attached to a three-dimensional carrier frame comprising a set of support surfaces that, as part of the attaching process, mate to at least two board portions of the set of board portions. The folding of the rigid-flex circuit element includes folding at the bend portions to locate the at least two board portions to be proximate to the corresponding support surfaces on the carrier frame. As part of the attaching, the at least two board portions are attached to the corresponding support surfaces on the carrier frame, and the circuit board assembly at least partially surrounds a majority of a stylus position detection portion and is attached thereto with the carrier frame fixed relative to an alignment frame.

At a block 830, the stylus position detection portion is coupled to a stylus suspension portion (e.g., utilizing a rotationally adjustable clamping arrangement). In various implementations, the alignment of the stylus suspension portion (e.g., including one or more position indicating elements) may be adjusted relative to the stylus position detection portion (e.g., including an optical sensing configuration, which operates in conjunction with the position indicating elements) before the orientation of the stylus suspension portion is fixed relative to the stylus position detection portion. For example, such adjustments may be made before clamping a rotationally adjustable clamping arrangement (e.g., utilizing a V-groove 710 with set screws 720) to fix the rotational orientation of the stylus suspension portion relative to the stylus position detection portion.

The disclosure of U.S. provisional patent application Ser. No. 62/565,961, filed Sep. 29, 2017, is incorporated herein in its entirety.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A coordinate measuring machine (CMM) probe configuration for integrating circuits into a CMM probe, the CMM probe configuration comprising:
 a stylus position detection portion comprising:
  an alignment frame; and
  an optical sensing configuration mounted in a fixed relationship to the alignment frame, the optical sensing configuration comprising at least a first light source and a first position sensitive detector;
  wherein the alignment frame and the optical sensing configuration are configured to at least partially surround an interior beam path volume, and provide an opening in a distal end of the stylus position detection portion to provide access to the interior beam path volume;
 a stylus suspension portion arranged proximate to the distal end of the stylus position detection portion, comprising:
  a suspension frame that joins in a fixed relationship to the stylus position detection portion;
  a stylus coupling portion that is configured to be rigidly coupled to a stylus;
  a stylus motion mechanism that is attached to the suspension frame and the stylus coupling portion, and is configured to enable motion of the stylus coupling portion relative to the suspension frame; and
  a first position indicating element which is fixed relative to the stylus coupling portion and moves with the stylus coupling portion, the first position indicating element arranged to receive light from the light source along a first source light path and output a first measurement light beam along a first measurement light path to the first position sensitive detector, wherein the first measurement light beam moves according to corresponding motion of the first position indicating element; and
 a circuit board assembly comprising:
  a rigid-flex circuit element comprising a set of board portions comprising at least four board portions joined by a set of bend portions comprising at least three flexible bend portions having respective bend axes, wherein the bend axes of at least two of the bend portions form an angle between 60 and 120 degrees therebetween when the rigid-flex circuit element is in an approximately planar unfolded form; and
  a three-dimensional carrier frame comprising a set of support surfaces that mate to at least two board portions of the set of board portions, wherein the rigid-flex circuit element is configured to be folded at the bend portions to locate the at least two board portions to be proximate to corresponding support surfaces on the carrier frame; and
  wherein the at least two board portions are configured to be joined to the corresponding support surfaces on the carrier frame, and the circuit board assembly is configured to at least partially surround a majority of the stylus position detection portion and is joined thereto with the carrier frame fixed relative to the alignment frame.

2. The CMM probe configuration of claim 1, wherein the first position indicating element is configured to extend into the interior beam path volume through the opening in the distal end of the stylus position detection portion, and the first source light path and the first measurement light path are contained entirely in the interior beam path volume.

3. The CMM probe configuration of claim 1, wherein the first position indicating element is located outside of the interior beam path volume and the first source light path and the first measurement light path extend through the opening in the distal end of the stylus position detection portion.

4. The CMM probe configuration of claim 1, wherein the bend axes of at least two of the bend portions are approximately orthogonal when the rigid-flex circuit element is in an approximately planar unfolded form.

5. The CMM probe configuration of claim 1, wherein the carrier frame consists of an electrically insulating material.

6. The CMM probe configuration of claim 1, wherein the at least two board portions are configured to be joined to the corresponding support surfaces on the carrier frame by at least one of retention elements or bonding.

7. The CMM probe configuration of claim 1, wherein one or more support surfaces of the carrier frame abut one or more surfaces of the alignment frame.

8. The CMM probe configuration of claim 1, wherein the set of board portions comprises at least one connector board portion that electronically connects to at least one electronic component that is fixed to the alignment frame.

9. The CMM probe configuration of claim 8, wherein the at least one electronic component comprises a light source.

10. The CMM probe configuration of claim 8, wherein the at least one electronic component comprises the first position sensitive detector, and the at least one connector board portion comprises a signal amplifier that amplifies the output from the first position sensitive detector.

11. The CMM probe configuration of claim 1, wherein the rigid-flex circuit element is configured to be folded at the bend portions to locate the at least two board portions to abut the corresponding support surfaces on the carrier frame.

12. The CMM probe configuration of claim 1, wherein the carrier frame comprises at least one retention element that captures and holds at least one board portion proximate to a corresponding support surface on the carrier frame.

13. The CMM probe configuration of claim 1, wherein at least one board portion comprises at least one electronic component located on an exterior side of the at least one board portion and at least one electronic component located on an interior side of the at least one board portion and at least one of the support surfaces on the carrier frame has a cutout portion through which the at least one electronic component on the interior side extends.

14. The CMM probe configuration of claim 1, wherein the carrier frame comprises at least one rounded bend axis support region, and at least one bend portion is located proximate to the at least one bend axis support region when the rigid-flex circuit element is folded at the bend portions to locate the at least two board portions to be proximate to the corresponding support surfaces on the carrier frame.

15. The CMM probe configuration of claim 1, wherein the carrier frame comprises at least one support surface that is oriented transverse to the Z axis and that supports a board portion that is oriented transverse to the Z axis.

16. The CMM probe configuration of claim 1, wherein the set of board portions comprises at least one interior board portion and at least one exterior board portion, and when the rigid-flex circuit element is folded at the bend portions, the at least one interior board portion is located proximate to a corresponding support surface on the carrier frame, and the at least one interior board portion and the at least one exterior board portion are located approximately parallel to one another and at least partially overlapping with one another along a direction approximately normal to the at least one exterior board portion, the at least one interior board portion and the corresponding support surface on the carrier frame.

17. The CMM probe configuration of claim 1, wherein one of the board portions comprises a field programmable gate array that is configured to provide programmable access to the rigid-flex circuit element.

18. The CMM probe configuration of claim 1, wherein the suspension frame is coupled rigidly and releasably to the alignment frame.

19. The CMM probe configuration of claim 18, wherein the suspension frame mounts to the alignment frame using a rotationally adjustable clamping arrangement.

20. The CMM probe configuration of claim 1, wherein the carrier frame consists of an electrically insulating material and comprises at least one of integral spacers or insulating ribs that guide a metallic housing into position on the CMM probe configuration during its assembly and prevent contact between non-grounded conductive elements on the rigid-flex circuit element and the assembled metallic housing.

21. The CMM probe configuration of claim 1, wherein:
the optical sensing configuration comprises a second position sensitive detector;
the stylus suspension portion comprises a second position indicating element that is fixed relative to the first position indicating element and arranged to receive light from the light source along a second source light path and output a second measurement light beam along a second measurement light path to the second position sensitive detector, wherein the second measurement light beam moves according to corresponding motion of the second position indicating element; and
wherein the first and second position sensitive detectors are fixed to the alignment frame and the set of board portions comprises at least one connector board portion that electronically connects to at least one of the first and second position sensitive detectors.

22. The CMM probe configuration of claim 21, wherein first position indicating signals from the first position sensitive detector in combination with second position indicating signals from the second position sensitive detector are indicative of the position of the stylus coupling portion relative to the alignment frame.

23. The CMM probe configuration of claim 21, wherein the first position indicating element is a rotary detection deflector and the second position indicating element is an axial detection deflector.

24. The CMM probe configuration of claim 21, wherein the first position indicating element and the second position indicating element are rigidly coupled to one another and to the stylus coupling portion and are positioned within the interior beam path volume.

25. A system, comprising:
a scanning probe comprising:
a stylus position detection portion comprising:
an alignment frame; and an optical sensing configuration mounted in a fixed relationship to the alignment frame, the optical sensing configuration comprising at least a first light source configuration and first and second position sensitive detectors;

wherein the alignment frame and the optical sensing configuration are configured to at least partially surround an interior beam path volume, and provide an opening in a distal end of the stylus position detection portion to provide access to the interior beam path volume;

a stylus suspension portion arranged proximate to the distal end of the stylus position detection portion, comprising:

a suspension frame that joins in a fixed relationship to the stylus position detection portion;

a stylus coupling portion that is configured to be rigidly coupled to a stylus having a contact portion for scanning along a surface of a workpiece;

a stylus motion mechanism that is attached to the suspension frame and the stylus coupling portion, and is configured to enable motion of the stylus coupling portion relative to the suspension frame;

a first position indicating element which is fixed relative to the stylus coupling portion and moves with the stylus coupling portion, the first position indicating element arranged to receive light from the first light source configuration along a first source light path and output a first measurement light beam along a first measurement light path to the first position sensitive detector, wherein the first measurement light beam moves according to corresponding motion of the first position indicating element; and a second position indicating element which is fixed relative to the stylus coupling portion and moves with the stylus coupling portion, the second position indicating element arranged to receive light from the first light source configuration along a second source light path and output a second measurement light beam along a second measurement light path to the second position sensitive detector, wherein the second measurement light beam moves according to corresponding motion of the second position indicating element;

a circuit board assembly comprising:

a rigid-flex circuit element comprising a set of board portions comprising at least four board portions joined by a set of bend portions comprising at least three flexible bend portions having respective bend axes; and a three-dimensional carrier frame comprising a set of support surfaces that mate to at least two board portions of the set of board portions, wherein the rigid-flex circuit element is configured to be folded at the bend portions to locate the at least two board portions to be proximate to the corresponding support surfaces on the carrier frame; and wherein the at least two board portions are configured to be joined to the corresponding support surfaces on the carrier frame, and the circuit board assembly is configured to at least partially surround a majority of the stylus position detection portion and is joined thereto with the carrier frame fixed relative to the alignment frame; and a processing portion that processes a first set of position indicating signals from the first position sensitive detector and a second set of position indicating signals from the second position sensitive detector to determine a 3-D position of the contact portion of the stylus.

26. The system of claim 25, wherein the set of board portions of the rigid-flex circuit element comprises the processing portion that processes the first set of position indicating signals from the first position sensitive detector and the second set of position indicating signals from the second position sensitive detector to determine the 3-D position of the contact portion of the stylus.

27. A method of assembling a scanning probe for use with a coordinate measuring machine (CMM), the method comprising:

folding a rigid-flex circuit element comprising a set of board portions comprising at least four board portions joined by a set of bend portions comprising at least three flexible bend portions having respective bend axes, wherein the bend axes of at least two of the bend portions form an angle between 60 and 120 degrees therebetween when the rigid-flex circuit element is in an approximately planar unfolded form before the rigid-flex circuit element is folded;

attaching the rigid-flex circuit element to a three-dimensional carrier frame comprising a set of support surfaces that, as part of the attaching, mate to at least two board portions of the set of board portions, wherein the folding of the rigid-flex circuit element includes folding at the bend portions to locate the at least two board portions to be proximate to corresponding support surfaces on the carrier frame, and wherein as part of the attaching, the at least two board portions are attached to the corresponding support surfaces on the carrier frame, and a circuit board assembly at least partially surrounds a majority of a stylus position detection portion and is attached thereto with the carrier frame fixed relative to an alignment frame; and coupling the stylus position detection portion to a stylus suspension portion, wherein:

the stylus position detection portion comprises:

the alignment frame; and an optical sensing configuration mounted in a fixed relationship to the alignment frame, the optical sensing configuration comprising at least a first light source and a first position sensitive detector;

wherein the alignment frame and the optical sensing configuration at least partially surround an interior beam path volume, and provide an opening in a distal end of the stylus position detection portion to provide access to the interior beam path volume; and the stylus suspension portion is arranged proximate to the distal end of the stylus position detection portion and comprises:

a suspension frame that joins in a fixed relationship to the stylus position detection portion;

a stylus coupling portion that is configured to be rigidly coupled to a stylus;

a stylus motion mechanism that is attached to the suspension frame and the stylus coupling portion, and enables motion of the stylus coupling portion relative to the suspension frame; and a first position indicating element which is fixed relative to the stylus coupling portion and moves with the stylus coupling portion, the first position indicating element arranged to receive light from the light source along a first source light path and output a first measurement light beam along a first measurement light path to the first position sensitive detector, wherein the first measurement light beam moves according to corresponding motion of the first position indicating element.

* * * * *